July 19, 1927.
G. E. HOWARD
1,636,564
REGULATING GLASS FEEDERS
Filed March 8, 1924
2 Sheets-Sheet 1
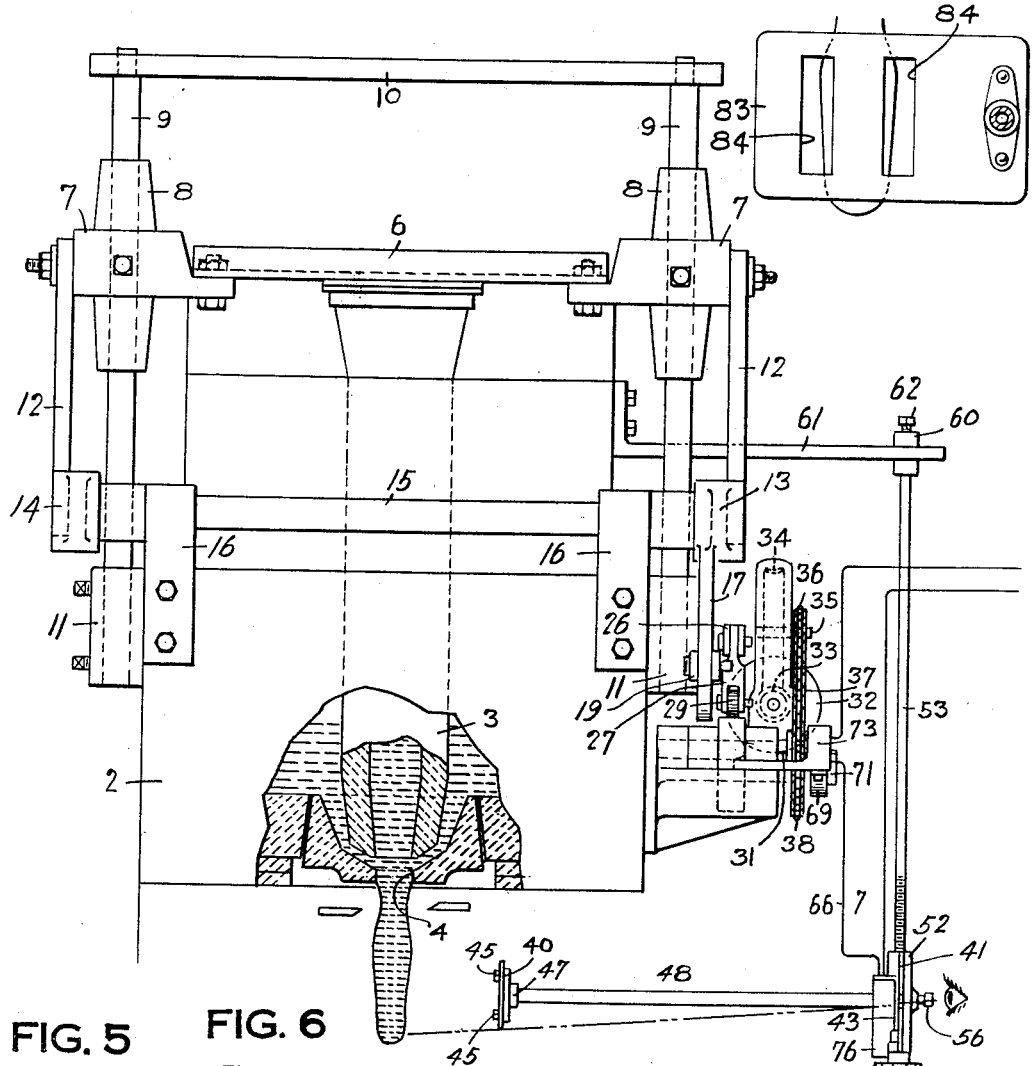
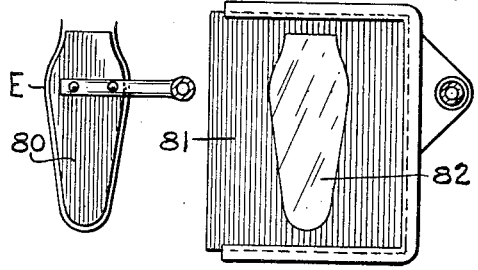
INVENTOR
George E Howard
By Kay, Totten Brown,
Attorneys

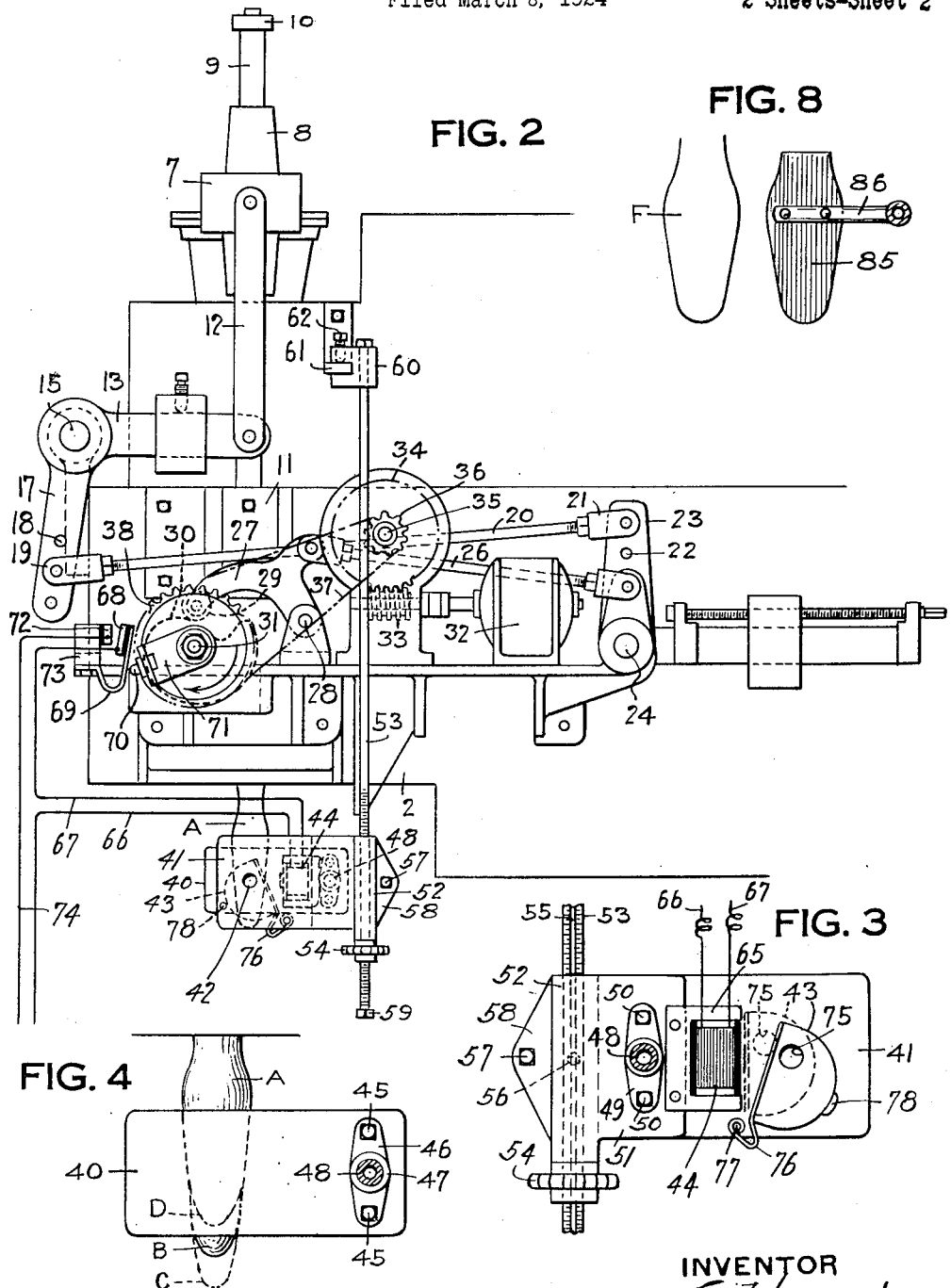

Patented July 19, 1927.

1,636,564

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

REGULATING GLASS FEEDERS.

Application filed March 8, 1924. Serial No. 697,805.

My invention relates to the regulation of feeders for molten glass which operate to discharge the glass in a succession of freely-hanging drops or mold charges. A glass feeder of this type should deliver mold charges of equal weight as nearly as possible, and each mold charge should be of the same shape and size as every other mold charge. Operating conditions, however, are constantly subject to disturbances on account of changes in temperature within the feeder or within the tank furnace to which the feeder is attached, and also by reason of changes in the glass level in the tank furnace, fluctuations in the motive power which drives the feeder, and other factors which it is difficult to keep constant.

Any substantial change, either in the temperature of the glass, or in the amount of glass delivered by the feeder at each stroke, manifests itself in a change in the shape of the pendant gather, and particularly in the length thereof. Thus, if the feeder is operating normally and the temperature of the glass is then increased, the gathers will become longer than the normal length. Conversely, if the glass becomes slightly cooler, the gathers will be shorter than the normal length. Such changes in the shape, size or temperature of the gathers may not be readily perceptible if the full length of the gather is observed.

Variations in length of as little as 5% are often objectionable. It will be apparent that, as the gather of glass moves rapidly during its formation and its descent to the mold, it is difficult to observe such small variations without a gauge or other object of comparison. Moreover, changes usually occur progressively in small increments, the successive drops differing only slightly from each other, and these increments are too small to be noticeable by the unaided eye. Consequently, the operator's attention is not drawn to the change until it has attained considerable proportions. It is highly important that weight, shape and temperature be all maintained as constant as possible, and it sometimes happens that the weight will remain constant while the temperature changes and this is not easily detected by the operator who ordinarily uses a scale to detect the change of weight but has no sensitive and accurate means to detect temperature changes.

It is a general object of my invention to provide for a close and accurate observation of the drops delivered by a glass feeder, and to enable the operator which is charged with the duty of regulating the feeder to see at a glance whether or not the drops being discharged are of the proper size, shape and temperature.

Another object of my invention is to provide mechanism of simple construction for carrying out this method of observing the drops delivered by a glass feeder and to provide means for adjusting the observing mechanism to suit drops of different sizes.

In one manner of carrying out my invention, I provide a screen arranged for vertical adjustment at one side of the path of the descending drops of glass, this screen being so positioned that, when the drop is fully formed and ready to be cut off, the screen will obscure all part of the drop except a small portion of its lower end. I also provide an apertured plate spaced some distance from the screen, and in such position that an observer looking through the aperture in the plate will be able to see so much of the drop of glass as is left uncovered by the screen. In order that each drop may be observed at the proper instant, I provide a shutter for closing the aperture, this shutter being operated automatically to close the aperture at the instant when each drop is fully formed, preferably immediately before severing, at which time the lower end of a normal drop will be visible below the screen and the drop will have reached its greatest length. Since the observer's view is cut off at the moment when the drop is in the correct position to be observed, his eye retains an image of the projecting portion of the drop and he is able to know whether this projecting portion is of normal length or of abnormal length. Any slight departure from the normal length of the drop will produce a change in the appearance of the lower end of the drop as seen by the observer, because only a small part of the vertical length of the gather is seen at any time, and a change in the length of the drop, which would amount to only a small fraction of its total length, will make a readily visible change in the size of the exposed part of the drop. For example, a drop may be ten inches long at the instant that the shutter is closed and may project below the screen for a distance of one inch. If a change of one-half inch occurs in the length of the drop, or about 5%, the portion extending below the screen will be either 50% greater or 50% less than that normally visible. Thus a change of only 5% in the length of the gather is indicated by a change of 50% in the portion seen by the operator, and is thereby readily detected.

To determine temperatures and to gauge dimensions other than length, I provide screens which may be of various forms, as will hereinafter appear.

The volume and weight of a drop are determined by its various dimensions, so that when the drop varies from a given size, the operator may regulate the feeding apparatus to increase or decrease the size of the drop, as desired, thus maintaining uniformity of feed. Further, a gather of excessive length may result from a too high temperature in the glass tank, or a shorter gather may indicate that the temperature is too low, in which case the operator will regulate the heat in the tank and in the feeder accordingly.

For a further understanding of my invention, reference may now be had to the accompanying drawings, in which Fig. 1 is a front elevational view of a glass feeder of a standard commercial type equipped with visual indicating mechanism constructed in accordance with my invention; Fig. 2 is a side elevational view of the structure shown in Fig. 1; Fig. 3 is an enlarged side elevational view of the shutter mechanism; Fig. 4 is a diagrammatic side elevational view showing the relation between the screen and the gathers of glass, and Figs. 5, 6, 7 and 8 are diagrammatic views showing modifications of the screen device of Fig. 4.

In the drawings, the numeral 2 indicates the housing of a glass feeder within which a plunger 3 reciprocates vertically above a discharge opening 4. This feeder is of the same general type as that described and claimed in my co-pending application for Letters Patent filed February 27, 1919, Serial No. 279,541, and the mechanism for reciprocating the plunger is similar to that described and claimed in my co-pending application filed May 11, 1922, Serial No. 560,111. It will be understood that the construction of the feeder and plunger-operating mechanism are shown herein only for the purpose of illustrating my invention, which may be applied equally as well to any form of glass feeder which produces a succession of freely-hanging gathers or drops.

The plunger 3 is suspended from a hanger 6, the ends of which are bolted to projections extending inwardly from two slide castings 7. The slide castings 7 carry slide bushings 8 which surround and slide upon vertical guide rods 9, the upper ends of which are connected by means of a bar 10, and the lower ends of which are secured in supports 11 bolted to the outer wall of the feeder housing 2.

For the purpose of reciprocating the two slides 8, two pitmen 12 are loosely pivoted at their upper ends to the slide castings, and are loosely attached at their lower ends to the outer ends of levers 13 and 14, both of which are carried by a horizontal rock shaft 15 extending across the front of the feeder housing 2 and mounted in bearings 16 which are bolted to the feeder housing. The rock shaft 15, as shown in Fig. 2, also carries a depending lever arm 17 provided with several openings 18 for adjustably attaching a coupling 19 to which is attached one end of a connecting rod 20, the other end of which is attached by means of a coupling 21 to any one of several openings 22 in a lever 23 which extends upwardly from a horizontal rock shaft 24. The rock shaft 24 also carries a crank lever 25 which is connected by means of a connecting rod 26 to a curved lever 27, one end of which is mounted on a stationary pivot 28, while its other end carries a cam roller 29 resting upon the periphery of a cam 30 which is secured to a horizontal cam shaft 31 driven from any suitable source of power. As shown, the cam shaft 31 is driven from an electric motor 32, the armature shaft of which carries a worm 33 meshing with a worm wheel 34 that is mounted on a horizontal shaft 35. The shaft 35 carries a small sprocket wheel 36 which, through a chain 37, drives a larger sprocket wheel 38 that is secured to the cam shaft 31.

The cam 30 rotates continuously in a clock-wise direction, as seen in Fig. 2, and operates through the roller 29 to rock the lever 27 around its pivot 28, thus reciprocating the connecting rod 26 and rocking the shaft 24. This rocking movement is communicated through the lever 23, the connecting rod 20 and the lever 17 to the rock shaft 15 and thence to the two lifting levers 13 and 14, thereby raising the plunger 3. When the cam 30 releases the lever 27 the plunger is allowed to fall. The shaft 31 thus makes one complete revolution for each stroke of the plunger 3, and the cam shaft 31 may therefore be conveniently employed for actuating the visual indicating mechanism, with which my present invention is particularly concerned. This indicating mechanism will now be described.

The essential parts of the visual indicating mechanism are a fixed screen 40, a vertically adjustable plate 41 having a sight aperture 42 and a shutter 43 which is actuated by means of an electro-magnet 44 to close the aperture 42 once during each cycle of the feeder.

The screen 40 is secured by means of bolts 45 to a bracket 46 having a collar 47 which is attached to one end of a tube or rod 48. The other end of the member 48 is attached to a bracket 49 which is secured by means of bolts 50 to a slide casting 51.

The sighting plate 41 is also secured to the slide casting 51 by means of the bolts 50. The slide casting 51 is provided with a split clamping portion 52 which surrounds a screw threaded vertical rod 53. In order to adjust the slide casting 52 vertically upon the rod 53, a handle 54 is screwed upon the rod 53 beneath the slide casting and supports the weight of the casting and its attachments. By turning the handle 54 the sighting plate 41, and also the screen 40, may be raised or lowered to any desired vertical position on the rod 53. In order to prevent the device from turning upon the rod 53 a keyway 55 is formed in the rod 53 and receives a suitable key carried by the clamp portion 52 of the slide casting 51. The clamp portion 52 is also provided with a horizontally tapped opening through which extends a set screw 56 as shown in Fig. 1. This set screw fixes the adjusted position of the device upon the rod 53. A bolt 57 extends through openings in the split portion 58 of the slide casting and regulates the tightness with which the casting surrounds the rod 53. A nut 59 is applied to the lower end of the rod 53 and prevents the shutter and screen device from being screwed off from the rod.

At its upper end, the vertical rod 53 is screw-threaded for attachment to a clamp 60 which has a tapped opening to receive the rod 53, and which also has a horizontal slot which fits over a horizontal bracket 61 that is secured to the outer wall of the feeder or to any other convenient stationary support. A set screw 62 secures the clamp 60 to the bar 61.

The electromagnet 44 is mounted upon a plate 65 that is secured to the slide casting 51, and is provided with suitably insulated binding posts, not shown, for connecting the electromagnet to any suitable source of current. Lead-wires to the electromagnet 44 are indicated diagrammatically at 66 and 67. A circuit-closing device is inserted in one of these lead-wires, and is so arranged that the circuit is closed through the electromagnet once during each cycle of the machine. Fig. 2 of the drawing shows one way of doing this. As shown in this figure, the lead-wire 67 is connected to a movable contact member 68 which is mounted upon and insulated from a spring arm 69 which extends into the path of an adjustable wiper 70 carried by a member 71 that is adjustably secured to the cam shaft 31. A stationary contact member 72 is mounted upon and insulated from a stationary support 73 and is connected through a lead-wire 74 to one terminal of the source of current, the lead-wire 66 being connected to the other terminal of the current source.

The wiper 71 revolves with the cam shaft 31 and once during each revolution it forces the movable contact member 68 into engagement with the fixed contact member 72, thereby completing the circuit through the electromagnet 44. When the electromagnet is thus energized, it draws the shutter 43 from the position shown in Fig. 3, where the sighting opening 75 of the shutter registers with the sighting opening 42 in the plate 41, to the position shown in dotted lines, Fig. 3, where the shutter covers the opening 42.

When the wiper 70 releases the spring arm 69, the movable contact member 68 is withdrawn from the fixed contact member 72 which interrupts the circuit through the winding of the electromagnet 44 and permits the shutter 43 to return to the position shown in full lines, Fig. 3, where the sighting opening 43 is again uncovered. This return movement of the shutter 43 is produced by means of a flat spring member 76 which supports the shutter 43 and is attached to a pin 77 carried by the plate 41. The shutter 43 is held in the proper position to uncover the opening 42 by means of a stop 78 carried by the plate 41.

When the device described above is applied to a glass feeder, the parts are so adjusted that an observer looking through the opening 42 in the plate 41 will see each successive gather or drop of glass in about the manner shown in Fig. 4, at the instant when the opening 42 is closed by the shutter 43. This figure shows a gather A hanging freely below the feeder and ready to be cut off from the parent body of glass. At this time the lower end B of the gather is seen protruding below the lower edge of the screen 40. The vertical position of the device is so selected that the portion B of the gather, which is visible at the instant when the opening 42 is covered, is only a small part of the complete gather. Therefore, if the operating condition of the feeder should change so as to lengthen the gather A and bring its lower end, for example, to the position shown at C, Fig. 4, such elongation will be plainly visible below the screen 40 because the protruding portion of the gather will then be two or three times the length of the protruding portion B of a normal gather. The operator is thus able to see at a glance that the feeder operation needs to be changed so as to shorten the gathers of glass.

If the operating conditions of the feeder should change so as to shorten the gather A, to bring the lower end of the gather, for example, to the position shown at D, Fig. 4, the operator will see no glass protruding below the screen 40 at any time, and he is thus informed that the feeder must be regulated so as to lengthen the gathers. A similar indication is given if only a very slight portion of the lower end of the gather is seen below the screen 40.

A glass feeder is required at different times to deliver drops which vary considerably in their shape and size, and the device herein described may be readily adjusted in accordance with any desired size of drop by loosening the clamping screw 56 and turning the hand wheel 54 to raise or lower the device upon the rod 53. The precise moment in each cycle of the feeder at which the shutter 43 closes the opening 42 may also be varied as desired by changing the position of the member 71 upon the cam shaft 31. I prefer that this adjustment be such that the opening 42 shall be closed just before each gather is cut off, because the gather is then fully formed.

Referring now to the modified device shown in Fig. 5, I provide a screen or gauge 80 that may be substituted for the screen 40, either in conjunction with a shutter such as 43, or without such a shutter. This plate 80 is of substantially the same length, width and outline as the desired gather of glass A, but is preferably of such size as to appear somewhat smaller when located between the eye of the observer and the path of the travel of the gathers, one of which is indicated at E. With this form of plate not only the length but the width of the gather may be gauged.

In Fig. 6 I show a gauge-plate or screen 81 that may be shaded by blackening or otherwise, but has a clear central portion 82 the dimensions of which may be varied to adapt it to various sizes of gathers. The clear portion 82 may be colored to correspond to the color of the molten glass, and a light may be placed behind the screen 81 so as to give the area 82 an appearance closely resembling the actual standard gather of glass, both in size, shape, color and brightness. Such an illuminated screen may be placed so that the actual gather and the standard outline are visible side by side at the instant when the observation takes place.

In Fig. 7, a plate 83 similar to the plate 40 is shown provided with openings 84 by means of which the width of the gather may be gauged, the length of the gather being observed below the lower edge of the plate as in the case of the plate 40.

Fig. 8 shows a still further modification of the screen in which an opaque member 85, having the outline of the desired glass gathers, is supported by any suitable means, such as a bracket 86 in such position that the member 85 is seen side by side with the gather F at the time when the observation takes place.

The various plates or screens may be employed also to determine the approximate temperature of the glass, by indicating the color thereof. In this case the screens are colored to the shade of yellow or red that the glass presents when at a given temperature. Any variation by the glass from this color may be readily observed by reason of the contrast thereof with the screen.

The sighting arrangement may be varied in many respects within the scope of my invention. While the straight lower edge of the screen 40 is a simple and satisfactory means for showing the length of the gather, the screen 40 may be provided at its upper edge with a notch in the nature of a gun sight, in which case the device is adjusted so that the lower end of the gather at the moment of observation is seen fitting within the notch if the gather is normal, or is above or below the notch if the gather is of improper length. It is also within the broad scope of my invention to utilize light beams for indicating the length of the gathers instead of observing the gathers directly, and such light beams may be derived either from the incandescent glass itself or from a separate source of light which may be obscured by the gather to an extent which indicates the length of the gather and its departure from normal length. These variations are not illustrated herein and are mentioned only to show the scope of my invention, which includes any means or method for causing gathers delivered by a glass feeder to produce a visible appearance which indicates any substantial variation of the gathers from their normal sizes.

I claim as my invention:

1. In the regulation of a glass feeder which periodically produces successive descending gathers of molten glass, the method that comprises delivering the gathers past a given standard, observing the appearance of one of the gathers in its relation to said standard, and then, if the said appearance is abnormal, regulating the delivery of succeeding gathers to cause them to present normal appearance with respect to said standard.

2. In the feeding of molten glass, the method which comprises delivering a succession of gathers of glass past a visible gauge which has predetermined relation to the position of normal gathers forming below the feeder, observing the appearance of one of the gathers with relation to said gauge at a predetermined time in the formation of said gather and, if said gather is found to be abnormal, regulating the delivery of succeeding gathers to cause them to present normal appearance with respect to said gauge.

3. In the regulation of a glass feeder which periodically produces descending gathers of molten glass, the method which comprises placing a gauge in position to obscure a predetermined portion of each normal gather delivered by the feeder, simultaneously observing the gauge and one of the descending gathers at a predetermined time in the formation of said gather, and then, if said gather is found to be abnormal, regulating the delivery of succeeding gathers to cause them to present normal appearance with respect to said gauge.

4. The method which comprises delivering gathers of molten glass past a screen device at predetermined intervals, observing the appearance of certain of said gathers with respect to said screen, and limiting the period of observation.

5. The method which comprises delivering a gather of molten glass to a point of observation, and cutting off the view of said gather at a predetermined time relative to the formation thereof.

6. The method of ascertaining the normal or abnormal delivery of glass gathers by a glass feeder, which comprises the steps of providing a color standard with which the gathers may be compared to determine their temperature, delivering a gather past the standard, and simultaneously observing said gather and said standard during the formation of the gather.

7. The method of ascertaining the normal or abnormal delivery of glass gathers by a glass feeder, which comprises the steps of providing a screen device of predetermined size and color with which the shape and temperature characteristics of the gathers may be compared, delivering a gather past the screen, and simultaneously observing said gather and said screen during the formation of the gather.

8. The method that comprises periodically delivering gathers of molten glass past a point of observation, providing a standard screen device between said point of observation and the path of movement of said gathers for comparing the characteristics of the gathers, and periodically obscuring the view from said point of observation when each of said gathers has reached a predetermined position with respect to said screen device to indicate to the observer the condition of the gather at the moment of such obscuration.

9. Apparatus for determining the character of gathers of molten glass, which comprises means for directing the gathers past a given point, an observation point, a gauge device disposed between said first-named point and said observation point, and means controlled by said first-named means for intermittently shutting off the view from said observation point.

10. Apparatus for determining the character of gathers of molten glass, which comprises a gauge device adjacent to the point of formation of the gathers, an aperture through which the gathers may each be viewed when in proximity to said gauge device, and a shutter to close said aperture when the gather has been completely formed.

11. The combination with means for feeding gathers of glass, of apparatus for determining the character of said gathers comprising a gauge device past which said gathers are fed, an aperture through which said gauge device and gathers may be viewed, a shutter, and means intermittently actuated by the feeding means for actuating said shutter to alternately open and close said aperture.

12. The combination with a glass furnace provided with means for intermittently discharging gathers of glass, of means for ascertaining the character of said gathers, comprising a gauge device past which said gathers are caused to move, an aperture through which said gauge device may be viewed, a shutter for said aperture, an electro-magnetic device for actuating said shutter, and means controlled by the feeding mechanism for energizing said electro-magnetic device each time that a gather of glass is formed.

13. The combination with means for forming gathers of glass, of a gauge device, a sight device permitting periodic observation of said gathers with respect to said gauge, and means controlled by the gather forming means, for controlling the operation of said sight device.

14. The method of regulating the periodic delivery of glass gathers by a glass feeder that comprises providing a screen between the point of observation and the path of movement of the gathers, obscuring the view of each gather from said point of observation at a given time in the cycle of operation of the feeder, periodically observing the relative position of a gather and said screen at the moment when the view of the gather is so obscured and, if said gather is found to be of abnormal shape, changing the operation of the feeder to produce succeeding gathers of normal shape.

15. In the regulation of a glass feeder which periodically produces descending gathers of glass, the method that comprises placing a gauge in position to obscure a portion of each gather at a predetermined time in its formation, leaving visible a lower end portion of the gather, and simultaneously observing the gauge and the gather at said predetermined time in the formation of the gather.

In testimony whereof I, the said GEORGE E. HOWARD, have hereunto set my hand.

GEORGE E. HOWARD.